(12) United States Patent
Sridharan et al.

(10) Patent No.: US 7,782,771 B2
(45) Date of Patent: Aug. 24, 2010

(54) ADJUSTING TO NETWORK LATENCY CHANGES

(75) Inventors: Murari Sridharan, Sammamish, WA (US); Sanjay N. Kaniyar, Redmond, WA (US); Deepak Bansal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 11/650,162

(22) Filed: Jan. 5, 2007

(65) Prior Publication Data

US 2008/0165684 A1 Jul. 10, 2008

(51) Int. Cl.
*G01R 31/08* (2006.01)
(52) U.S. Cl. ............... 370/230; 370/236; 370/248
(58) Field of Classification Search .......... None
See application file for complete search history.

(56) References Cited

U.S. PATENT DOCUMENTS 6,076,114 A * 6/2000 Wesley ............... 709/235
6,757,245 B1 * 6/2004 Kuusinen et al. ......... 370/230
2005/0063307 A1 * 3/2005 Samuels et al. ......... 370/235
2005/0135248 A1 * 6/2005 Ahuja et al. ........... 370/235
2006/0029037 A1 * 2/2006 Chen et al. ............ 370/351

OTHER PUBLICATIONS

Sarolahti et al., "Forward RTO-Recovery (F-RTO): An Algorithm for Detecting Spurious Retransmission Timeouts with TCP and the Stream Control Transmission Protocol (SCTP)", Aug. 2005, Network Working Group IETF RFC 4138.*

* cited by examiner

*Primary Examiner*—Seema S Rao
*Assistant Examiner*—Christine Duong
(74) *Attorney, Agent, or Firm*—Wolf, Greenfield & Sacks, P.C.

(57) ABSTRACT

Techniques are provided for adjusting to changes to the latency for a connection between two nodes on a network. In accordance with some embodiments, when a transmitting node encounters a retransmission timeout for a packet sent to a receiving node, the latency for the connection is newly measured and used to calculate a new retransmission timeout period for subsequent transmissions by the transmitting node. In some embodiments, the latency is not newly measured if a selective acknowledgement is received indicating that congestion on the network is only temporary.

17 Claims, 5 Drawing Sheets

FIG. 1

(PRIOR ART)

ADJUSTING TO NETWORK LATENCY CHANGES

FIELD OF INVENTION

This invention relates to network communications, and more particularly to managing communications in networks employing the transmission control protocol (TCP).

BACKGROUND OF INVENTION

Transmission control protocol (TCP) is widely used for network communications, including communication via the Internet. TCP is a reliable transport protocol, meaning that it provides various mechanisms to ensure that data sent by a transmitting network node arrives intact at a receiving network node. For example, TCP provides that the receiving node sends an acknowledgement to the transmitting node for each data packet received, such that the transmitting node is notified that the packet arrived at the receiving node.

A transmitting node determines that a sent packet has been lost on the network when either duplicate acknowledgements are received from the receiving node, or a retransmission timeout is reached. Briefly, a duplicate acknowledgement is a notification sent by the receiving node to the transmitting node indicating that one of an ordered sequence of packets has not been received as expected by the receiving node. TCP provides that if the transmitting node receives two duplicate acknowledgements indicating that a particular packet has not been received by the receiving node, the transmitting node determines that the considered packet has been lost on the network, and re-sends it.

A retransmission timeout occurs when the transmitting node does not receive an acknowledgement for a sent packet from the receiving node within a predetermined, expected time (i.e. the retransmission timeout period). In this respect, the retransmission timeout period (hereinafter referred to as "RTO") varies constantly because it is calculated based on the latency of the connection on which the packet is sent, which also varies constantly. The latency for a connection may vary for any of numerous reasons, such as traffic on the network, the network path chosen for a connection, device failures on the path, and other reasons. Latency is generally defined as the round trip time (hereinafter referred to as "RTT") for a particular packet on the connection, meaning the period that elapses between when the packet is originally sent on the connection and when an acknowledgement is received for the packet at the transmitting node. A transmitting node usually attempts to measure the RTT for a connection whenever a packet is first transmitted. Specifically, the node begins an RTT sample, which is completed when an acknowledgement is received for the packet, and which serves as a basis for calculating the RTO for subsequent transmissions.

It should be noted that TCP assumes that a retransmission timeout occurs because of congestion on the network. As a result, TCP provides that after a retransmission timeout occurs, the rate at which the transmitting node sends data over the network is reduced significantly, so as to reduce the traffic on the network and allow the congestion to subside.

Figure 1:
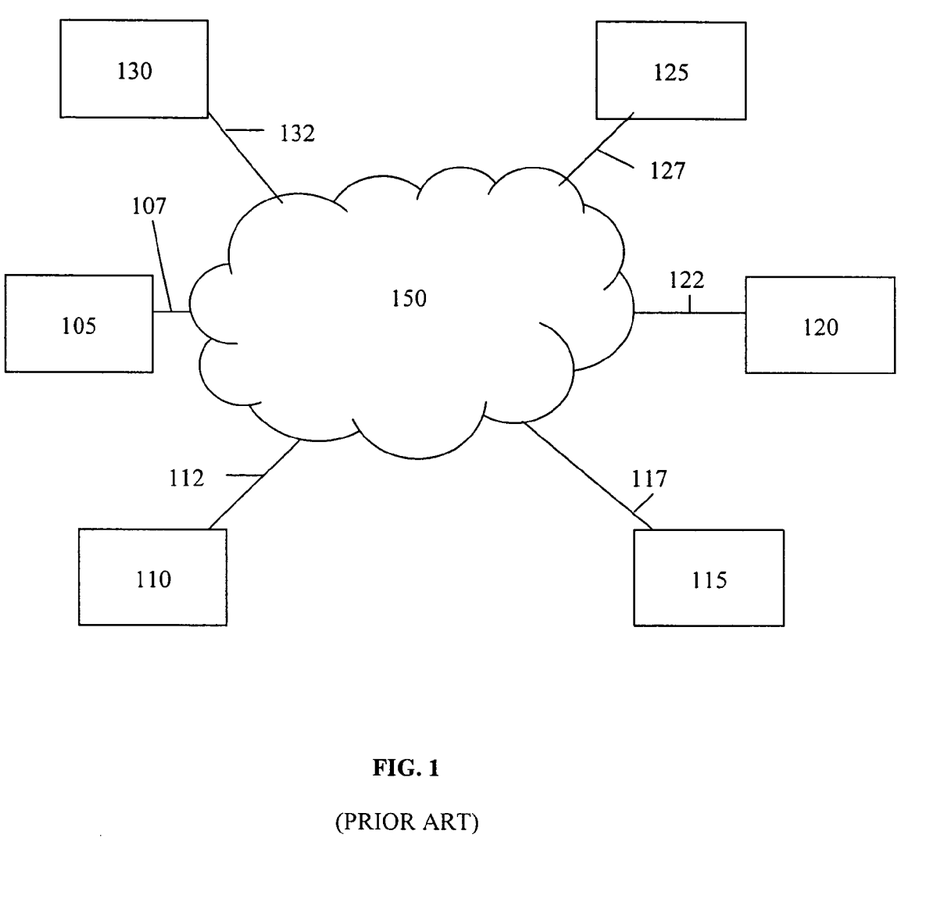
FIG. 1 is a block diagram illustrating network communications according to the TCP protocol in accordance with the prior art.

Conventional network communication according to the TCP protocol, including the measurement of RTT, is illustrated in FIG. 1. In system 100, which implements the TCP protocol, nodes 105, 110, 115, 120, 125 and 130 are connected to network 150 via connections 107, 112, 117, 122, 127 and 132, respectively. For a connection between transmitting node 105 and receiving node 120, transmitting node 105 transmits one or more packets to receiving node 120, initiating an RTT sample for the connection when the one or more packets are sent. Receiving node 120 sends an acknowledgement for each received packet back to transmitting node 105. When this occurs, transmitting node 105 completes the RTT sample for each acknowledged packet. The RTT for the connection is determined by the transmitting node to be the period between when the considered packet is sent and when an acknowledgement for the packet is received. The RTO for subsequent transmissions by transmitting node 105 is calculated based on this RTT. For example, in some implementations, the transmitting node maintains a history of RTT samples, and calculates the RTO based on an RTT value smoothed across multiple samples (e.g., the exponential average of a number of samples).

Despite the fact that latency changes frequently, TCP provides that the RTT for a connection is measured only when the packet in question has never been retransmitted. That is, if the packet is retransmitted (e.g., after a retransmission timeout occurs), an acknowledgement received for the packet is not used to complete an RTT sample. This is because TCP employs Karn's algorithm, which states that when a packet is retransmitted, it can not be reliably determined whether an acknowledgement received for the packet is for the retransmission or the original transmission of the packet. As a result, no conventional technique exists for re-measuring the RTT for a connection when a packet is retransmitted.

SUMMARY OF INVENTION

Applicants have appreciated that the above-described aspect of TCP which provides that the RTT for a connection is not re-measured if a packet is retransmitted can be problematic when latency for a connection increases dramatically (e.g., caused by a change in the network path between two nodes, an increase in traffic on the network, a failure of a device on the network, etc.), such that, for example, the RTT increases to exceed the RTO. For example, if a packet is sent, and the RTT for the connection then increases such that it exceeds the RTO for the transmission, the node is assured of encountering a retransmission timeout for the packet, such that the packet is assured of being retransmitted, and the rate at which the node transmits data will be significantly decreased. Because the packet is retransmitted, and because TCP provides that the RTT for the connection is not re-measured for the connection when a packet is retransmitted, the RTO for subsequently transmitted packets is not updated, meaning that the node is likely to encounter a retransmission timeout for each of these packets as well. As a result, a large number of packets can be retransmitted unnecessarily, and the transmitting node's send rate is significantly decreased, even though packets may not have actually been lost in the network.

Accordingly, some embodiments of the invention provide a technique for adjusting to changes in the RTT for a connection. For example, some embodiments provide that when a retransmission timeout is encountered and a packet is retransmitted, the RTT may be newly measured, and a new RTO may be calculated based on the newly measured RTT and employed for subsequent transmissions. For example, in some embodiments, if the RTT for the connection has not increased measurably since the transmission of the original packet, then the new RTO may be calculated based on a smoothed RTT value which incorporates the newly measured RTT and previously measured RTT samples. As such, the new RTO may be the same as, or similar to, the original RTO. However, if the RTT has increased measurably, a new RTO may be calculated based on this newly measured RTT, and not based on previously measured RTT samples. As a result, the new RTO may be used in the transmission of subsequently sent packets.

Some embodiments of the invention provide a technique which accounts for temporary congestion on the network. In this respect, temporary congestion generally occurs when a particular node on the network transmits a large burst of traffic, causing packets sent by other nodes to be lost. In general, as soon as the temporary condition goes away (e.g., the burst of traffic is delivered and acknowledged), the RTT for the connection reverts to normal. This is in contrast to normally occurring changes to RTT, which may come about because, for example, the original network route for a connection experienced a failure, such that a new route must be chosen between the nodes in question. As such, with temporary congestion, modifications to RTO may be unnecessary. Accordingly, some embodiments of the invention employ one or more features of the TCP protocol to determine whether network congestion is temporary, and if it is determined that this is the case, a new RTT for the connection is not measured. The feature(s) and this technique are described in further detail below.

Some embodiments of the invention may provide a technique enabling fast recovery from changes to network latency. In this respect, some conventional implementations of TCP provide that when a node encounters a retransmission timeout, the node may not send any new data before the previously sent packets are sent and acknowledged. In some embodiments of the invention, a technique is provided which employs an optional capability of the TCP protocol, called forward roundtrip timeout recovery (F-RTO), which enables a new packet to be sent when another packet is retransmitted. Because a new packet is retransmitted, the RTT for the connection may be reliably re-measured, such that a new RTO may be calculated.

BRIEF DESCRIPTION OF DRAWINGS

The accompanying drawings are not intended to be drawn to scale. In the drawings, each identical or nearly identical component illustrated in the various figures is represented by a like numeral. For purposes of clarity, not every component may be labeled in every drawing. In the drawings.

DETAILED DESCRIPTION

Some embodiments of the invention provide techniques for recovering from increases to latency on a connection. For example, some embodiments provide techniques for re-measuring the RTT for a connection upon encountering a retransmission timeout, and employing this information when sending new packets. For example, some embodiments provide that if the RTT has changed significantly, a new RTO (or a variation thereof) is defined (e.g., calculated), based on the newly measured RTT, for use with subsequent transmissions on the connection. As a result, the node may be less likely to encounter retransmission timeouts for subsequent transmissions, such that the node is likely to recover more quickly from the retransmission timeout encountered on the original transmission. Conversely, if it is determined that the RTT for the connection has not changed significantly, the RTO for subsequent transmissions on the connection may be defined based on an RTT value which incorporates previously measured RTT samples (e.g., a smoothed RTT value which includes the newly measured RTT), such that the RTO may remain the same as, or similar to, the RTO used for the original transmission.

Some embodiments provide techniques for recovering from network congestion that is temporary in nature. For example, the RTT for a connection generally increases when a new network route between the transmitting node and the receiving node is chosen (e.g., because the original route experienced a failure). Temporary congestion, by contrast, generally occurs when a large burst of traffic is transmitted on to the network, such that when the traffic subsides, the RTT on the connection reverts to normal. As a result, calculating a new RTO for the connection is unnecessary if network congestion is temporary. Accordingly, some embodiments employ one or more features of the TCP protocol to determine whether network congestion is temporary and respond accordingly. For example, some embodiments employ the TCP feature known as "selective acknowledgement." Briefly, selective acknowledgement allows a receiving node to notify a transmitting node which of a group of ordered packets (identified by sequence numbers) it has received and which it still expects. Thus, selective acknowledgement allows the transmitting node to determine whether any of the group of packets has been received at the receiving node. If so, in some embodiments, the transmitting node determines that the network congestion that caused the retransmission timeout is temporary, and does not re-measure the RTT for the connection and/or attempt to define an appropriate RTO.

In some embodiments, a technique is provided which allows fast recovery from latency changes. In some embodiments, an optional TCP feature known as "forward RTO recovery" (F-RTO) is employed. Generally, TCP prevents a transmitting node from transmitting any new data once it encounters a retransmission timeout for a previously sent packet. That is, the transmitting node must re-transmit, and receive an acknowledgement for, each previously sent packet before the node may transmit any new packets. Because of Karn's algorithm, described above, the transmitting node has no way of re-measuring the RTT for the connection before the new data is sent. However, when F-RTO is employed, the transmitting node is permitted to transmit up to two new data packets when a retransmission timeout is encountered and a packet is re-transmitted. The newly sent packet(s) enable(s) the transmitting node to re-measure the RTT for the connection immediately, such that the RTO for the connection may be adjusted, if appropriate, once the newly sent packet is acknowledged. This allows the transmitting node to recover from retransmission timeouts more quickly than if F-RTO is not employed.

Some embodiments employ aspects of both F-RTO and selective acknowledgement. In this respect, in some conventional TCP implementations, a receiving node may only send an acknowledgement for a particular packet after it has acknowledged all previous packets (i.e. identified by lower sequence numbers than the particular packet). Of course, if an acknowledgement for a packet that is newly transmitted in accordance with F-RTO is only sent after the receiving node has acknowledged all previous packets, the RTT measurement for the newly transmitted packet may be inaccurate, since the receiving node might have acknowledged that packet much earlier. As a result, in some embodiments, selective acknowledgement is employed to allow a receiving node to selectively acknowledge a packet which is newly transmitted in accordance with F-RTO, so that the accuracy of the RTT measurement for the newly transmitted packet may be improved.

Figure 2:
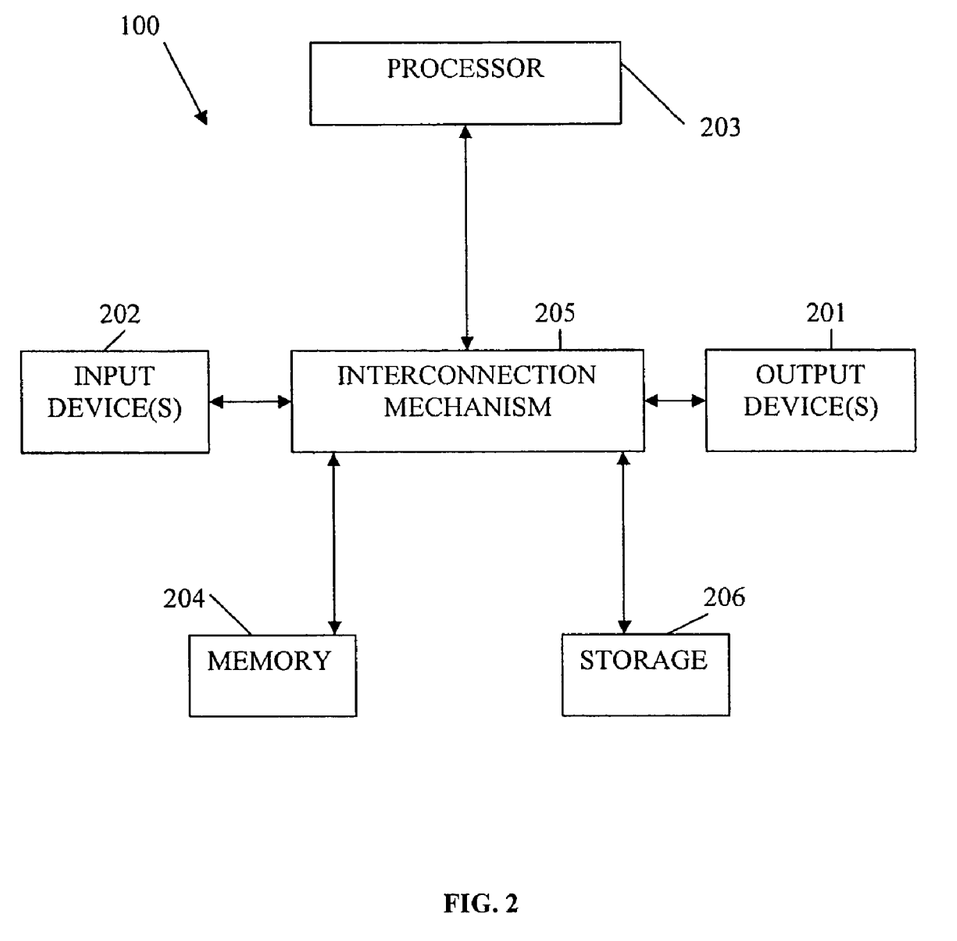
FIG. 2 is a block diagram depicting an exemplary computer system on which aspects of embodiments of the invention may be implemented.

Various aspects of embodiments of the invention may be implemented on one or more computer systems, such as the exemplary computer system 200 shown in FIG. 2. Computer system 200 includes input device(s) 202, output device(s) 201, processor 203, memory system 204 and storage 206, all of which are coupled, directly or indirectly, via interconnection mechanism 205, which may comprise one or more buses, switches, and/or networks. The input device(s) 202 receive input from a user or machine (e.g., a human operator), and the output device(s) 201 display or transmit information to a user or machine (e.g., a liquid crystal display or LCD). The processor 203 typically executes a computer program called an "operating system" (e.g., a Microsoft Windows-family operating system, such as Microsoft Windows Vista®, or any other suitable operating system) which controls the execution of other computer programs, and provides scheduling, input/output and other device control, accounting, compilation, storage assignment, data management, memory management, communication and data flow control functions. Collectively, the processor and operating system define the platform for which software and other computer programming languages are written.

The processor 203 may execute one or more computer programs to implement various functions. These computer programs may be written in any type of computer programming language, including a procedural programming language, object-oriented programming language, macro language, or combination thereof. These computer programs may be stored in storage system 206. Storage system 206 may hold information on a volatile or non-volatile medium, and may be fixed or removable. Storage system 206 is shown in greater detail in FIG. 3.

Figure 3:
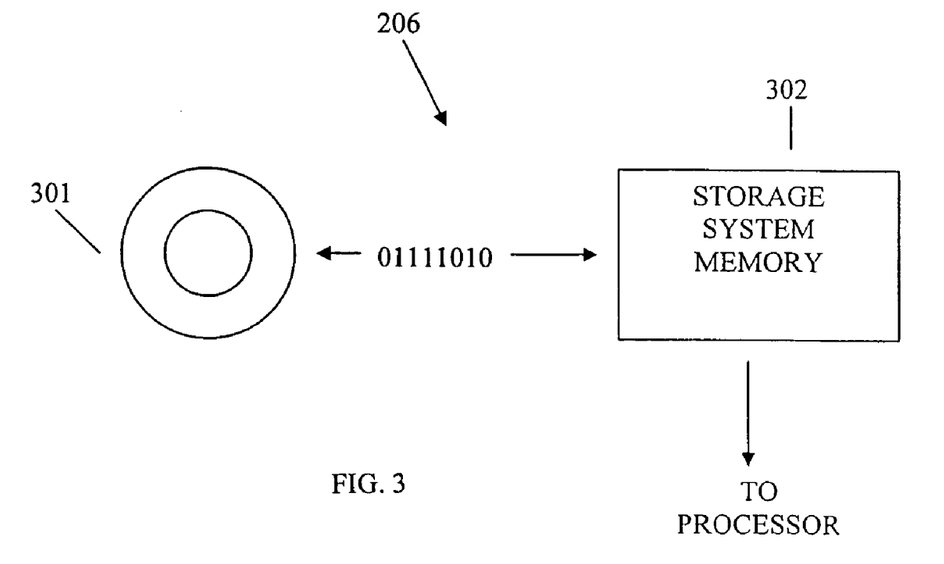
FIG. 3 is a block diagram depicting an exemplary computer memory which may be employed to implement aspects of embodiments of the invention.

Storage system 206 typically includes a computer-readable and -writable non-volatile recording medium 301 on which signals are stored that define a computer program or information to be used by the program. The medium may, for example, be a disk or flash memory. Typically, in operation, the processor 203 causes data to be read from the non-volatile recording medium 301 into a volatile memory 302 (e.g., a random-access memory, or RAM) that allows for faster access to the information by the processor 203 than does the medium 301. This memory 302 may be located in storage system 206, as shown in FIG. 3, or in memory system 204, as shown in FIG. 2. The processor 203 generally manipulates the data within the integrated circuit memory element 204, 302 and then copies the data to the medium 301 after processing is completed. A variety of mechanisms are known for managing data movement between the medium 301 and the integrated circuit memory element 204, 302, and the invention is not limited to any particular mechanism. The invention is also not limited to a particular memory system 204 or storage system 206.

An example is described with reference to FIG. 1 which illustrates the difficulties associated with conventional approaches to recovering from changes in latency for a connection, wherein latency is not re-measured when a retransmission timeout is encountered.

Assume a connection between node 105 and 120 in FIG. 1 which, at the time the connection is established, has an RTT equal to 500 milliseconds. The RTO for transmissions on this connection is calculated based on this RTT. Assume that after the RTT is measured, a first packet is sent from node 105 to node 120 on the connection, employing an RTO that is calculated based on this RTT.

Now assume that the RTT for the connection increases to 1.5 seconds. Because the RTT now exceeds the RTO, the node is assured of encountering a retransmission timeout for the first packet. However, as described above, TCP provides no mechanism for determining a new RTT (and thus a new RTO for subsequent transmissions) for the connection. As a result, the re-transmission of the first packet, and all subsequent transmissions by the node, use an RTO which is derived from the original RTT of 500 milliseconds. The node is assured of encountering a retransmission timeout for the re-transmission of the first packet, and for each subsequently transmitted packet, as long as the RTT is greater than the RTO. This is the case even if none of these packets are actually lost on the network (i.e. they arrive at node 120, but an acknowledgement is not received at node 105 before the RTO is reached by node 105). In addition, because each packet is re-transmitted, Karn's algorithm precludes re-measuring the RTT for the connection, meaning that this RTO is used, and retransmission timeouts continue to occur, until the RTT reverts to a value which no longer exceeds the RTO. The retransmission of each packet also causes unnecessary traffic on the network.

As described above, TCP provides for extreme reactions by a node when a retransmission timeout is encountered, since it presumes that the timeout is caused by congestion on the network. Specifically, when a node encounters a retransmission timeout, the "congestion window" for the node, or the amount of data that the node may keep outstanding (i.e. transmitted but unacknowledged), is dramatically decreased. Typically, for a one gigabit connection, TCP enables a node to keep approximately 8,300 packets outstanding. However, each time the node encounters a retransmission timeout, the congestion window is reduced to just one packet, since TCP presumes that the retransmission timeout occurred because the network is congested and seeks to eliminate the congestion. The congestion window gradually expands as the node is able to send new packets, but usually new packets are not sent until the node receives acknowledgements for all previously transmitted packets. During the time that the node's congestion window is decreased, its ability to send data is greatly reduced.

Any of several events may cause the RTT for a connection to exceed the RTO. One common scenario is when two diverse network paths provide connectivity between two nodes. If the latency of the second path is significantly higher than that of the first, and the first fails for some reason, then the RTT for the connection may increase such that it exceeds the RTO. Another scenario is when a user retains a TCP connection while moving from one network (e.g., a Wi-fi network) to another network with greater latency (e.g., a wired network). With the increasing prevalence of multi-homing, wherein a node maintains connectivity to two diverse networks, these scenarios are increasingly common.

Accordingly, some embodiments of the invention provide techniques for adjusting to changes to the RTT for a connection. For example, some embodiments provide for re-measuring the RTT for the connection, and calculating a new RTO for use with subsequent transmissions which accounts for the changed RTT.

Figure 4:
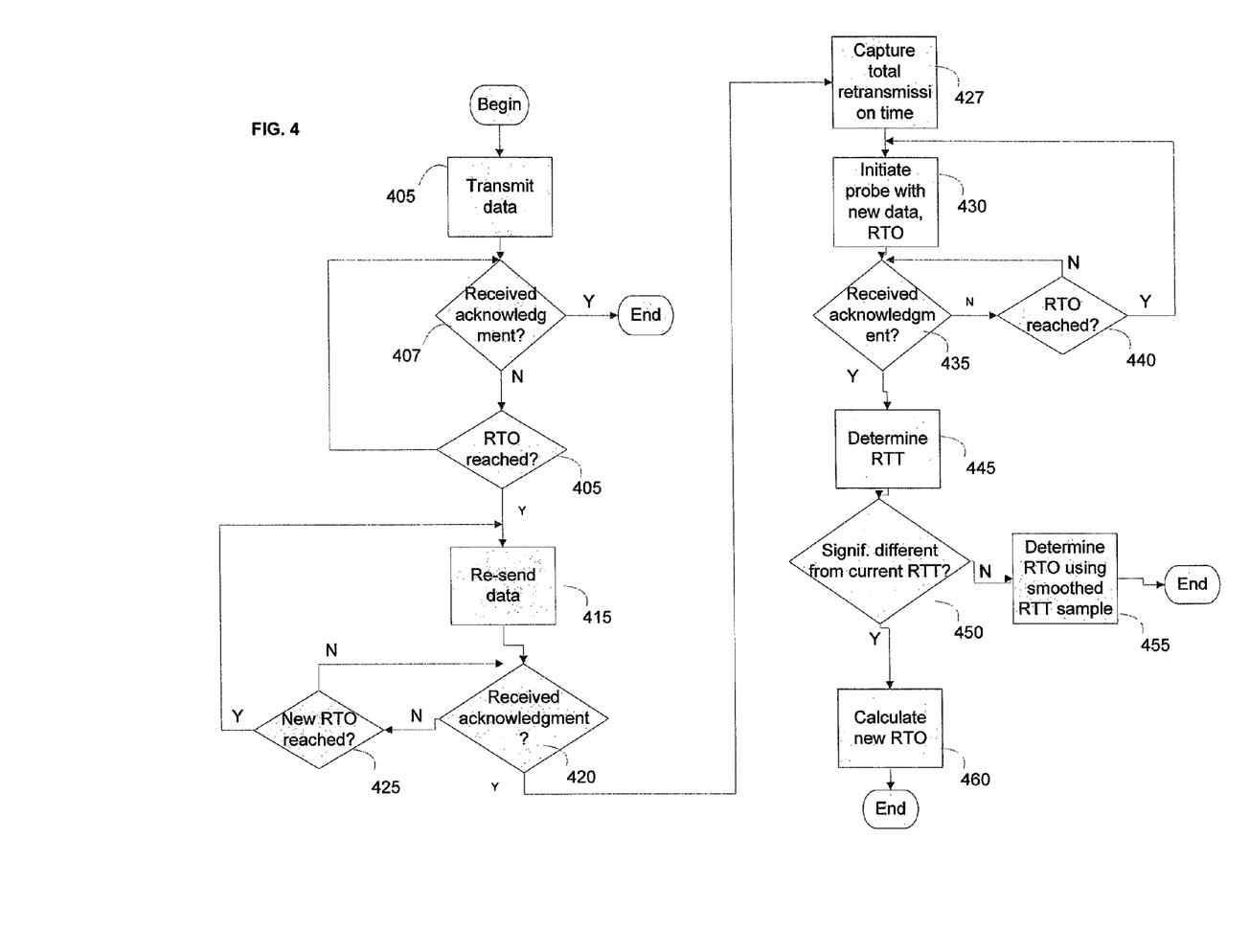
FIG. 4 is a flow chart depicting one example technique for adjusting to network latency changes, in accordance with some embodiments of the invention.

An exemplary process 400 for re-measuring the RTT for a connection and recalculating a new RTO based on the new RTT is shown in FIG. 4. At the start of process 400, the node (e.g., node 105, FIG. 1) transmits a packet on the connection (e.g., to node 120) in act 405. In act 407, a determination is made whether an acknowledgement for the packet has been received. If so, the process completes. If not, the proceeds to act 410, wherein it is determined whether the RTO for the packet has been reached. If the RTO has not been reached, the process returns to act 407. In this manner, acts 407 and 410 are repeated until either an acknowledgement for the packet is received or the RTO is reached.

If it is determined in act 410 that the RTO is reached, process 400 proceeds to act 415, wherein the packet is retransmitted, using a conservative RTO. The RTO for the retransmission may be set in any suitable fashion, as the invention is not limited in this respect. For example, in some embodiments, the RTO for the retransmission is set as twice the RTO for the original transmission. For example, if the RTO employed for the original transmission was 1 second, then the RTO for the re-transmission is set to 2 seconds.

The process then proceeds to act 420, wherein it is determined whether an acknowledgement has been received for the packet. If not, the process proceeds to act 425, wherein a determination is made whether the new RTO for the retransmission (i.e., set in act 415) has been reached. If not, the process returns to act 420, and acts 420 and 425 are repeated until either an acknowledgement is received or the RTO for the retransmission is reached.

If it is determined in act 425 that the new RTO has been reached, process 400 returns to act 415, wherein the packet is again re-transmitted. In some embodiments, the RTO for this retransmission is the same RTO as was employed for the first retransmission. However, the invention is not limited to such an implementation, as any suitable RTO may be employed. In this manner, acts 415, 420 and 425 are repeated until an acknowledgement is received in act 420.

Once it is determined that an acknowledgment has been received, the process proceeds to act 427, wherein the total retransmission time for the packet is determined. That is, the period between when the packet was first retransmitted in act 415 and when an acknowledgement is received in act 420 is determined.

The process then proceeds to act 430, wherein a probe is initiated to measure the RTT on the connection. In some embodiments, initiating the probe includes sending a new packet on the connection. In some embodiments, an extended RTO for the probe is used, which in some embodiments is set to equal the sum of the RTO used for the original transmission in act 405 and the total retransmission time determined in act 427. For example, if the RTO for the original transmission in act 405 was 1 second and the total retransmission time was 2 seconds, then the extended RTO for the probe is set to 3 seconds. In some embodiments, this extended RTO is used for the probe because it is known that the acknowledgement received in act 420 was received within this amount of time from the original transmission in act 405.

The process then proceeds to act 435, wherein it is determined whether an acknowledgement has been received for the probe. As described further below, the acknowledgement may be, for example, a selective acknowledgement, although the invention is not limited to such any particular implementation or processing technique.

If it is determined in act 435 that an acknowledgement has not been received for the probe, the process proceeds to act 440, wherein it is determined whether the extended RTO for the probe (i.e., set in act 430) has been reached. If the RTO for the probe has not been reached, the process returns to act 435. If the RTO for the probe has been reached, the process returns to act 430, wherein the probe is re-transmitted. In some embodiments, a new RTO may be employed for the retransmission of probe. For example, in some embodiments, the new RTO may be double the original RTO for the probe. Although not represented in FIG. 4, in some embodiments the probe may be re-transmitted a predetermined number of times (in some implementations, 5 times), and if an acknowledgement is not received, the connection is aborted.

If it is determined in act 435 that an acknowledgement has been received for the probe, the process proceeds to act 445, wherein the new RTT for the connection is determined. As described above, the new RTT is the period between when the probe was initiated (i.e., in act 430) and when the acknowledgement for the probe is received (i.e., in act 435).

The process then proceeds to act 450, wherein it is determined whether the newly measured RTT for the connection determined in act 445 is measurably different than the previous RTT for the connection (i.e. measured before act 405). This determination may be made in any of numerous ways, using any of numerous techniques, as the invention is not limited to a particular implementation. For example, in some embodiments, if the newly measured RTT is within a predetermined range of a smoothed RTT value which incorporates previous RTT measurements, then the newly measured RTT is determined to not be measurably different of the previous RTT for the connection.

If the newly measured RTT is determined to not be measurably different than the previous RTT, the process then proceeds to act 455, wherein the RTO is determined based on a smoothed RTT value (e.g., incorporating previously measured RTT samples). Process 400 then completes.

If it is determined in act 450 that the newly measured RTT is significantly different than the previous RTT (e.g., using the technique described above), then the process proceeds to act 455, wherein a new RTO is calculated for the connection. This may be performed in any of numerous ways, as the invention is not limited in this respect. For example, in some embodiments, any previously RTT measurements for the connection may be flushed, and the newly measured RTT may be used as input to calculate a new RTO. Process 400 then completes.

Performing process 400 may be unnecessary if the network is undergoing only temporary congestion, since in many instances the RTT for the connection reverts to normal after the congestion subsides. Accordingly, some embodiments of the invention employ techniques to determine whether congestion on the network is temporary in nature, and if so, does not proceed with re-measuring the RTT for the connection or calculating a new RTO. Some embodiments may, for example, employ a feature of TCP known as "selective acknowledgement" to determine whether network congestion is temporary. However, the invention is not limited to such an implementation, as temporary congestion may be detected using any suitable technique.

Selective acknowledgement in accordance with TCP allows a receiving node to notify a transmitting node that it has not received one or more of a group of ordered packets sent by the transmitting node. In this respect, TCP provides that each packet sent by the transmitting node to the receiving node is assigned a sequence number, such that receiving node understands which packets sent by the transmitting node it has yet to receive. As an example, assume that the transmitting node sends a packet having sequence number 100 to the receiving node. The receiving node understands that it should thereafter receive packets having sequence numbers progressing forward from sequence number 100. As a result, if (as an example) the receiving node receives packet 103 before receiving packet 102, the receiving node understands that it should expect to subsequently receive packet 102. Upon receiving packet 103, the receiving node may send a selective acknowledgement of packet 103 to the transmitting node which informs the transmitting node that it has received packet 103 and also awaits packet 102. Thus, selective acknowledgement informs the transmitting node that a portion of the packets it sent to the receiving node have arrived, but not all.

The fact that at least some packets have arrived at a receiving node may indicate that network congestion is only temporary, because if the RTT on a connection has increased significantly, it is unlikely that any packets would have been received and acknowledged by the receiving node. Accordingly, some embodiments of the invention provide techniques whereby a new RTT for a connection is not determined if the transmitting node receives a selective acknowledgement from the receiving node for any of a group of previously transmitted packets.

Figure 5:
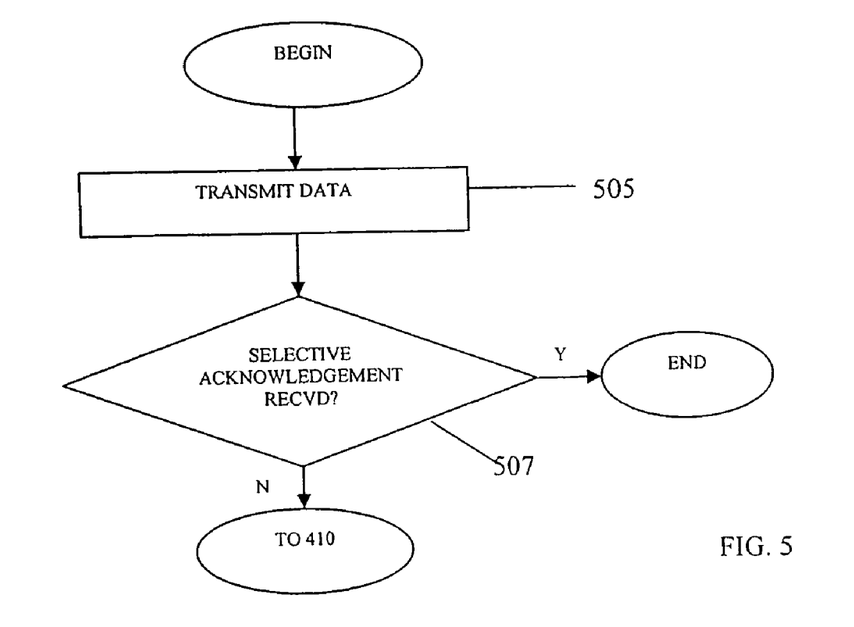
FIG. 5 is a flow chart depicting an example technique for adjusting to a temporary change to network latency, in accordance with some embodiments of the invention.

An exemplary process 500 whereby the RTT for a connection is newly measured only if it is determined that temporary congestion does not exist on the network is shown in FIG. 5. In general, process 500 may include many of the acts which are described above with reference to process 400. However, at least some of these acts may not be performed if a selective acknowledgement is received by the transmitting node.

At the start of process 500, a group of packets is sent by a transmitting node to a receiving node in act 505. In act 507, a determination is made whether a selective acknowledgement has been received at the transmitting node for any of the packets sent in act 505. If a selective acknowledgement has been received, process 500 completes.

However, if it is determined in act 507 that a selective acknowledgement has not been received, the rest of process 500 proceeds much like process 400, starting with act 410. Specifically, in act 510, it is determined whether the RTO for any of the packets has been reached. If not, the process returns to act 507. In this manner, acts 507 and 510 are repeated until either a selective acknowledgement is received or the RTO for one of the packets is reached.

If it is determined in act 510 that the RTO for a packet is reached, process 500 proceeds to act 415 (FIG. 4), and process 400 executes to completion as described above.

Some embodiments of the invention employ techniques to initiate a probe more quickly than might otherwise be possible. In this respect, as described above, TCP normally prevents a node from sending any new data until all previously sent packets have been acknowledged. For example, if a node transmits packets having sequence numbers 100-200 and encounters a retransmission timeout for any of the packets, the node must await acknowledgement of all packets before it may send a new packet. This can be problematic because the RTT for a connection can only be reliably determined for newly transmitted data, since it can not be determined whether an acknowledgement received for a retransmitted packet is for the original transmission or the retransmission.

Accordingly, some embodiments employ techniques designed to circumvent this aspect of TCP and initiate a probe before all previously transmitted packets have been acknowledged. For example, some embodiments employ F-RTO to adjust quickly to latency changes. As described above, F-RTO enables a node that encounters a retransmission timeout to send one new packet as it retransmits an original packet. Because the node is allowed to send the new packet with the retransmission, the RTT for the connection may be determined quickly after a timeout is encountered, such that the RTO for subsequent transmissions can be quickly adjusted.

Figure 6:
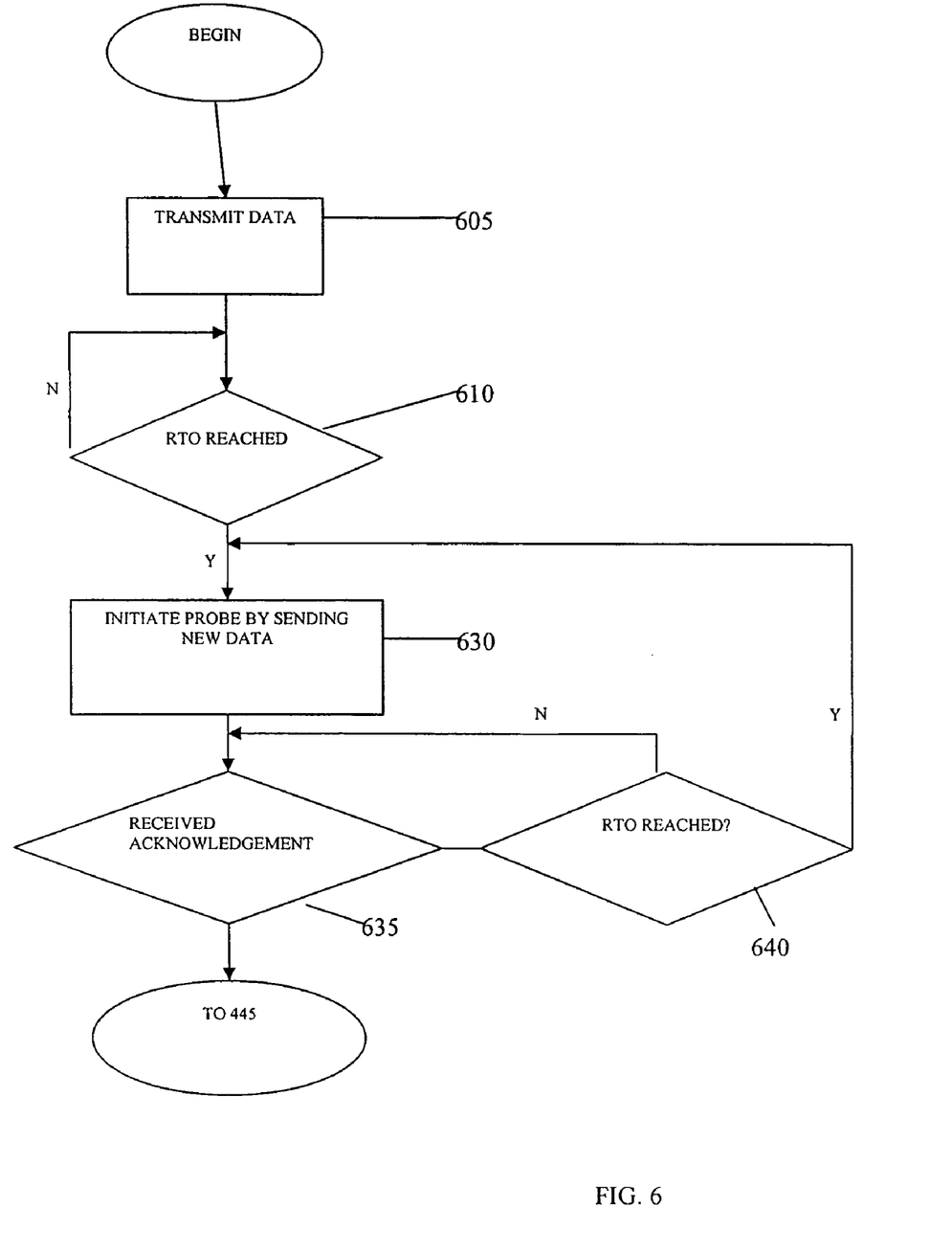
FIG. 6 is a flow chart depicting a technique for managing network latency changes using forward RTO-recovery (F-RTO) in accordance with some embodiments of the invention.

FIG. 6 depicts one example of a process 600 which employs F-RTO capabilities to expedite recovery from latency changes. Like process 500 shown in FIG. 5, process 600 includes many of the same acts described above with reference to process 400 shown in FIG. 4.

At the start of process 600, a packet is transmitted by a transmitting node in act 605. In act 610, it is determined whether a retransmission timeout for the packet has been reached. If not, the process returns to act 610, such that act 610 is repeated until the retransmission timeout is reached.

If a retransmission timeout is reached, the process proceeds to act 630, wherein a probe of the connection is initiated so that the RTT may be newly measured. For example, in accordance with F-RTO, the node may send a new packet. In some embodiments, an extended RTO may be employed for the probe. For example, in some embodiments the extended RTO may be equal to three times the RTO used for the original transmission in act 605. Of course, the invention is not limited in this respect, as any suitable RTO may be employed for the probe.

The process then proceeds to act 635, wherein it is determined whether an acknowledgement has been received for the probe. If not, the process proceeds to act 640, wherein it is determined whether the RTO for the probe (i.e., set in act 630) has been reached. If not, the process returns to act 635. If the RTO for the probe has been reached, the process returns to act 630, wherein the probe is re-transmitted. In some embodiments, a new RTO may be employed for the retransmission of probe. For example, in some embodiments, the new RTO may be double the original RTO for the probe. Although not represented in FIG. 6, in some embodiments the probe may be re-transmitted a predetermined number of times (in some implementations, 5 times), and if an acknowledgement is not received, the connection is aborted.

If it is determined in act 635 that an acknowledgement has been received for the probe, the process proceeds to act 445 (FIG. 4), and process 400 executes to completion as described above.

As noted above, some embodiments of the invention may employ aspects of F-RTO and selective acknowledgement, since in conventional TCP implementations, a receiving node may only send an acknowledgement for a particular packet after it has acknowledged all previous packets (i.e. identified by lower sequence numbers than the particular packet). This presents issues because if an acknowledgement for a newly transmitted packet (i.e., in accordance with F-RTO) is only sent after the receiving node has acknowledged all previous packets, the RTT measurement for the newly transmitted packet may be inaccurate, since the receiving node might have been able to acknowledge the packet much earlier. As a result, some embodiments employ selective acknowledgement to allow a receiving node to selectively acknowledge a newly transmitted packet so that the accuracy of the RTT measurement for the newly transmitted packet may be improved. However, the invention is not limited to such an implementation, as numerous processing techniques may be employed.

This invention is not limited in its application to the details of construction and the arrangement of components set forth in the foregoing description or illustrated in the drawings. The invention is capable of numerous other embodiments, and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A transmitting node for use in a system comprising the transmitting node, a receiving node, and a network which provides a connection over which the transmitting node and receiving node communicate data, the network employing a protocol which provides that the receiving node sends an acknowledgement to the transmitting node for each packet sent by the transmitting node and received by the receiving node, a latency of the connection being defined as a time between when a packet is sent by the transmitting node over the connection to the receiving node and when an acknowledgement sent by the receiving node for the packet over the connection is received by the transmitting node, the transmitting node comprising at least one processor programmed to:

(A) transmit a first packet to the receiving node over the connection;

(B) in response to having not received an acknowledgement for the first packet from the receiving node within a retransmission timeout period based at least in part on the latency of the connection prior to (A), determine a new latency for the connection;

(C) determine a new retransmission timeout period based at least in part on the new latency for the connection; and (D) employ the new retransmission timeout period in transmitting a second packet to the receiving node over the connection;

wherein the at least processor is further programmed to, in (B):

in response to having not received an acknowledgement for the first packet from the receiving node within a retransmission timeout period, retransmit the first packet to the receiving node;

receive an acknowledgement from the receiving node for the first packet;

in response to receiving the acknowledgement, determine a probe retransmission timeout period equal to a time which elapses between (A) and the receiving of an acknowledgement from the receiving node for the first packet;

transmit a probe packet to the receiving node, employing the probe retransmission timeout period;

receive an acknowledgement from the receiving node for the probe packet; and determine the new latency for the connection, equal to a time which elapses between the transmitting of the probe packet and the receiving of the acknowledgement for the probe packet.

2. The transmitting node of claim 1, wherein the at least one processor is further programmed to, in (B):

in response to having not received an acknowledgement for the first packet from the receiving node within a retransmission timeout period, transmit a probe packet to the receiving node;

receive an acknowledgement from the receiving node for the probe packet; and determine the new latency for the connection, equal to a time which elapses between the transmitting of the probe packet and the receiving of the acknowledgement for the probe packet.

3. The transmitting node of claim 1, wherein the at least one processor is further programmed to, in (C):

determine whether the new latency for the connection is significantly different from the latency of the connection prior to (A);

if it determined that the new latency is significantly different from the latency of the connection prior to (A), determine a new retransmission timeout period based at least in part on the new latency for the connection.

4. The transmitting node of claim 3, wherein the determination whether the new latency is significantly different from the latency of the connection prior to (A) is based on whether the new latency is within a predetermined range of the latency of the connection prior to (A).

5. The transmitting node of claim 1, wherein the protocol is transmission control protocol (TCP).

6. A computer-readable recording medium encoded with instructions which, when executed by a transmitting node in a system comprising the transmitting node, a receiving node, and a network which provides a connection over which the transmitting node and receiving node communicate data, the network employing a protocol which provides that the receiving node sends a selective acknowledgement to the transmitting node when the receiving node receives one of a sequenced set of packets but not another of the sequenced set of packets, a latency of the connection being defined as a time between when a packet is sent by the transmitting node over the connection to the receiving node and when an acknowledgement sent by the receiving node for the packet is received by the transmitting node over the connection, performs a method for adjusting to a change in a latency of the connection, the method comprising acts of:

(A) transmitting a sequenced set of packets to the receiving node over the connection;

(B) in response to having not received a selective acknowledgement for any of the sequenced set of packets from the receiving node within a retransmission timeout period which is based at least in part on the latency of the connection prior to the act (A), determining a new latency for the connection;

(C) determining a new retransmission timeout period based at least in part on the new latency for the connection; and (D) employing the new retransmission timeout period in transmitting a second sequenced set of packets to the receiving node over the connection;

wherein the act (B) further comprises:

in response to having not received an acknowledgement for the sequenced set of packets from the receiving node within a retransmission timeout period, retransmitting at least a portion of the sequenced set of packets to the receiving node;

receiving an acknowledgement from the receiving node for at least a portion of the sequenced set of packets;

in response to the act of receiving the acknowledgement, determining a probe retransmission timeout period equal to a time which elapses between performing the act (A) and the act of receiving an acknowledgement from the receiving node for at least a portion of the sequenced set of packets; transmitting a probe packet to the receiving node, employing the probe retransmission timeout period;

receiving an acknowledgement from the receiving node for the probe packet; and determining the new latency for the connection, equal to a time which elapses between performing the act of transmitting the probe packet and the act of receiving the acknowledgement for the probe packet.

7. The computer-readable recording medium of claim 6, wherein the act (B) further comprises:

in response to having not received an acknowledgement for the sequenced set of packets from the receiving node within a retransmission timeout period, transmitting a probe packet to the receiving node;

receiving an acknowledgement from the receiving node for the probe packet; and determining the new latency for the connection, equal to a time which elapses between performing the act of transmitting the probe packet and the act of receiving the acknowledgement for the probe packet.

8. The computer-readable recording medium of claim 6, wherein the act (C) further comprises:

determining whether the new latency for the connection is significantly different from the latency of the connection prior to the act (A);

if it determined that the new latency is significantly different from the latency of the connection prior to the act (A), determining a new retransmission timeout period based at least in part on the new latency for the connection.

9. The computer-readable recording medium of claim 8, wherein the determination whether the new latency is significantly different from the latency of the connection prior to the act (A) is based on whether the new latency is within a predetermined range of the latency of the connection prior to the act (A).

10. The computer-readable recording medium of claim 6, wherein the protocol is transmission control protocol (TCP).

11. In a system comprising a transmitting node, a receiving node, and a network which provides a connection over which the transmitting node and receiving node may communicate data, the network employing a protocol which provides that the receiving node sends an acknowledgement to the transmitting node for each packet sent by the transmitting node and received by the receiving node, a latency of the connection being defined as a time between when a packet is sent by the transmitting node over the connection to the receiving node and when an acknowledgement sent by the receiving node for the packet over the connection is received by the transmitting node, a method, performed by the transmitting node, for adjusting to a change in a latency of the connection, comprising acts of:

(A) transmitting a first packet to the receiving node over the connection;

(B) in response to having not received an acknowledgement for the first packet from the receiving node within a retransmission timeout period based at least in part on the latency of the connection prior to the act (A), transmitting a probe packet to the receiving node;

(C) receiving an acknowledgement from the receiving node for the probe packet;

(D) determining the new latency for the connection, equal to a time which elapses between performing the act of transmitting the probe packet and the act of receiving the acknowledgement for the probe packet;

(E) determining a new retransmission timeout period based at least in part on the new latency for the connection; and (F) employing the new retransmission timeout period in transmitting a second packet to the receiving node over the connection.

12. The method of claim 11, wherein the first packet comprises a set of sequenced packets, the protocol further provides for the receiving node sending a selective acknowledgement to the transmitting node when the receiving node receives at least one of a set of sequenced packets, and the act (B) further comprises:

determining whether a selective acknowledgement has been received for any of the set of sequenced packets; and if it is determined that no selective acknowledgement has been received for any of the set of sequenced packets, transmitting the probe packet to the receiving node.

13. The method of claim 11, wherein the act (C) further comprises: determining whether the new latency for the connection is significantly different from the latency of the connection prior to the act (A);

if it determined that the new latency is significantly different from the latency of the connection prior to the act (A), determining a new retransmission timeout period based at least in part on the new latency for the connection.

14. The method of claim 13, wherein the determination whether the new latency is significantly different from the latency of the connection prior to the act (A) is based on whether the new latency is within a predetermined range of the latency of the connection prior to the act (A).

15. The method of claim 11, wherein the protocol is transmission control protocol (TCP).

16. The method of claim 15, wherein the act (B) is performed in accordance with a forward RTO recovery capability of the TCP protocol.

17. The method of claim 15, wherein the act (E) further comprises calculating the new retransmission timeout period using a technique prescribed by TCP.

* * * * *